US005895987A

United States Patent [19]

Lo et al.

[11] Patent Number: 5,895,987

[45] Date of Patent: Apr. 20, 1999

[54] POWER OPERATOR FOR SWITCHGEAR WITH MANUAL FEATURES

[75] Inventors: Steve Chung-Bun Lo, Richmond Hill, Canada; Todd W. Klippel, Chicago, Ill.; Douglas B. Hill, Mississauga, Canada

[73] Assignee: S&C Electric Company, Chicago, Ill.

[21] Appl. No.: 08/996,085

[22] Filed: Dec. 22, 1997

[51] Int. Cl.[6] .......... H02H 3/00

[52] U.S. Cl. .......... 307/125; 361/5; 361/71; 361/605; 340/644; 200/50.26

[58] Field of Search .......... 307/125, 139, 307/143; 361/605, 71, 5, 6; 340/644, 664; 200/43.01, 50.26

[56] References Cited

U.S. PATENT DOCUMENTS

| | | | |
|---|---|---|---|
| 3,701,101 | 10/1972 | Heiz et al. | 340/825.53 |
| 4,223,365 | 9/1980 | Moran | 361/71 |
| 4,241,373 | 12/1980 | Mara et al. | 361/6 |
| 4,562,506 | 12/1985 | Moran | 361/71 |
| 5,025,171 | 6/1991 | Fanta et al. | 361/605 |
| 5,434,369 | 7/1995 | Tempco et al. | 200/52.26 |

*Primary Examiner*—Albert W. Paladini

*Attorney, Agent, or Firm*—James V. Lapacek

[57] ABSTRACT

A power operator for switchgear and the like is provided that is capable of either power or manual operation without the necessity of any decoupling or mode selection. The power operator is compact and easily affixed over a manual operating shaft of switchgear. The manual drive capabilities are always coupled for operation without any backdriving of the power source. The power operator includes a drive output affixed to the switchgear operating shaft, a manual operating shaft, and an arrangement for selectively coupling a power-driven input to the switchgear operating shaft. In a specific arrangement, the control arrangement of the power operator senses the position of the drive output and also senses the current drawn by the drive source. When controlling switchgear having a stored energy mechanism, operating positions are detected by sensing the tripping of the stored energy mechanism via the sensed current through the drive source.

28 Claims, 8 Drawing Sheets

POWER OPERATOR FOR SWITCHGEAR WITH MANUAL FEATURES

BACKGROUND OF THE INVENTION

1. Field of the Invention

The present invention relates generally to a power operator for switchgear and the like and more particularly to a power operator which is capable of either power or manual operation without the necessity of any decoupling or mode selection.

2. Description of Related Art

Various operators for switchgear and the like are shown in the following U.S. Pat. Nos.: 4,808,809; 5,025,171; 5,034,584; 4,669,589; and 5,075,521. Some of these arrangements provide both power and manual operation. For example, for manual operation, the arrangement in U.S. Pat. No. 4,804,809 requires disassembly. Manual operation in U.S. Pat. No. 5,034,584 is effected via a decoupling arrangement.

While these arrangements may be generally useful for their intended purposes, they do require separate additional operations when manual operation is desired, i.e. both manual and power operation cannot be performed without decoupling etc.

SUMMARY OF THE INVENTION

Accordingly, it is a principal object of the present invention to provide a power operator which is capable of either power or manual operation without the necessity of any decoupling or mode selection.

It is another object of the present invention to provide a power operator having manual drive capabilities which are always coupled for operation without any backdriving of the power source.

It is a further object of the present invention to provide a compact power operator which is easily affixed over a manual operating shaft of switchgear.

It is a yet another object of the present invention to provide a power operator which is arranged to operate switchgear having a stored energy mechanism via the sensing of the tripping of the stored energy mechanism.

It is a still further object of the present invention to provide a power operator which is easily installed on any switch without the necessity of any adjustments.

These and other objects of the present invention are achieved by a power operator for switchgear and the like which is capable of either power or manual operation without the necessity of any decoupling or mode selection. The power operator is compact and easily affixed over a manual operating shaft of switchgear. The manual drive capabilities are always coupled for operation without any backdriving of the drive source. The power operator includes a drive output affixed to the switchgear operating shaft, a manual operating shaft, and an arrangement for selectively coupling a power-driven input to the switchgear operating shaft. In a specific arrangement, the control arrangement of the power operator senses the position of the drive output and also senses the current drawn by the drive source. When controlling switchgear having a stored energy mechanism, operating positions are detected by sensing the tripping of the stored energy mechanism via the sensed current through the drive source.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
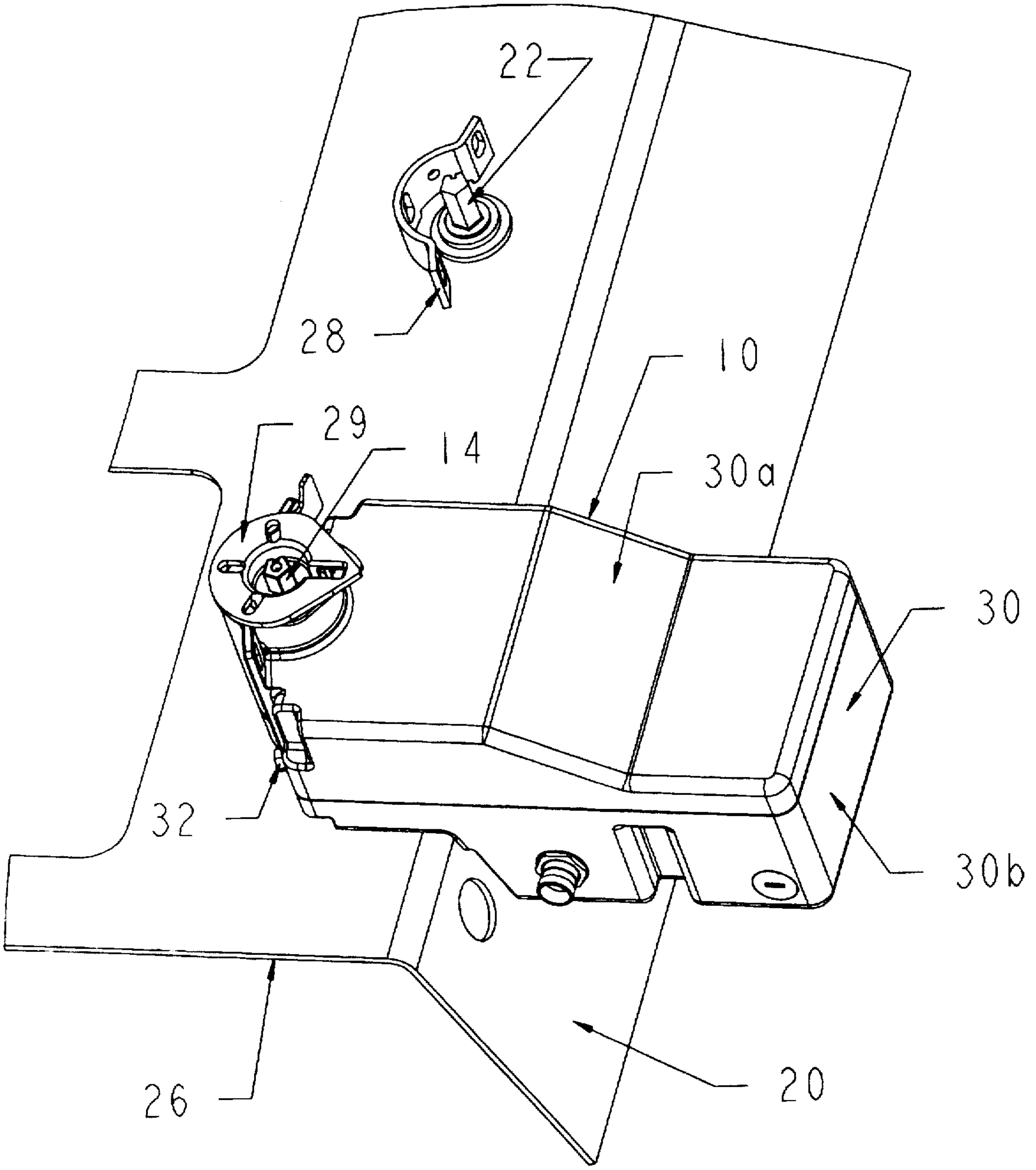
FIG. 1 is a perspective view of a power operator in accordance with the principles of the present invention in operative position on switchgear.
Figure 2:
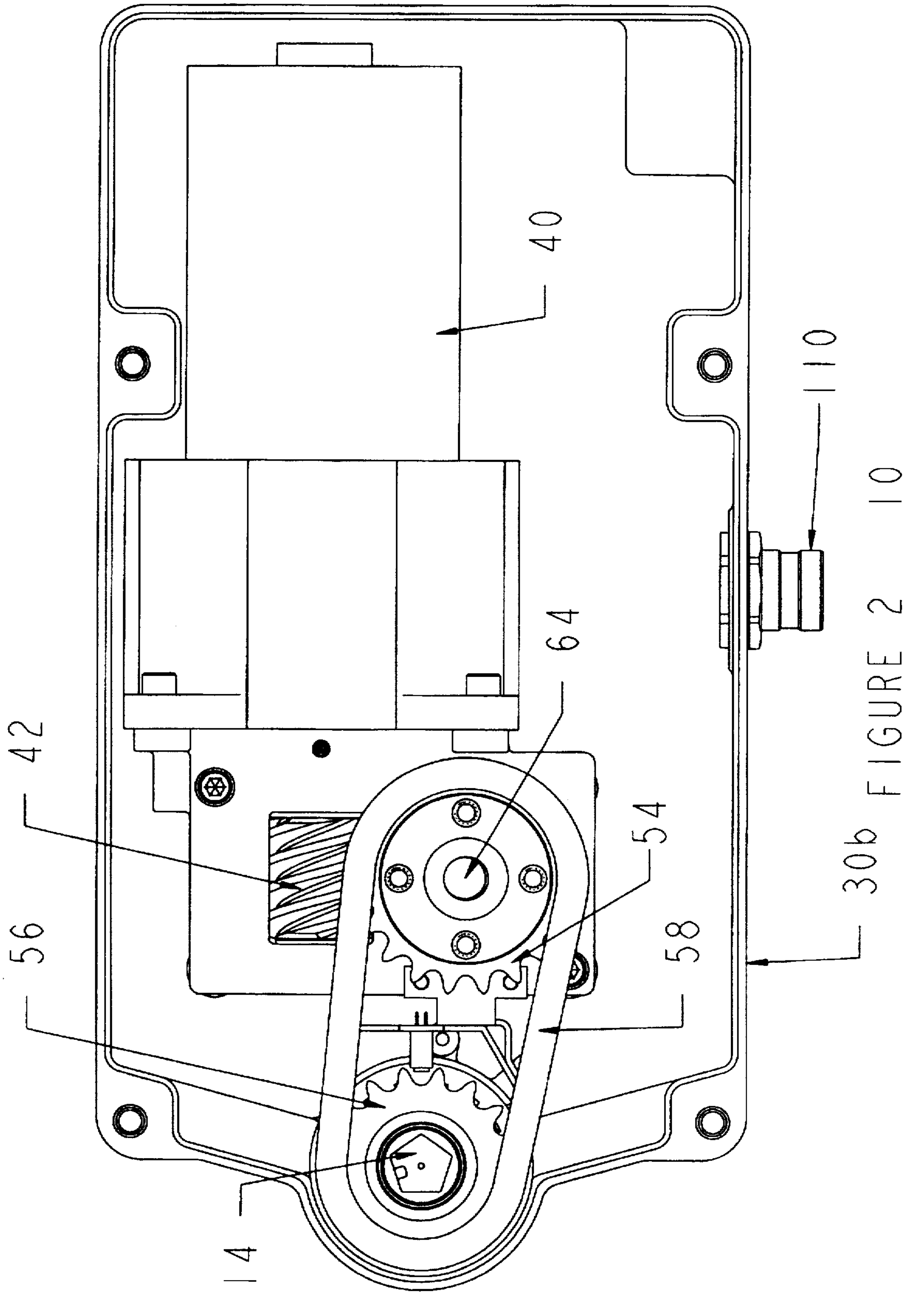
FIG. 2 is a top plan view of the power operator of FIG. 1 with an upper housing portion removed and parts removed for clarity.
Figure 3:
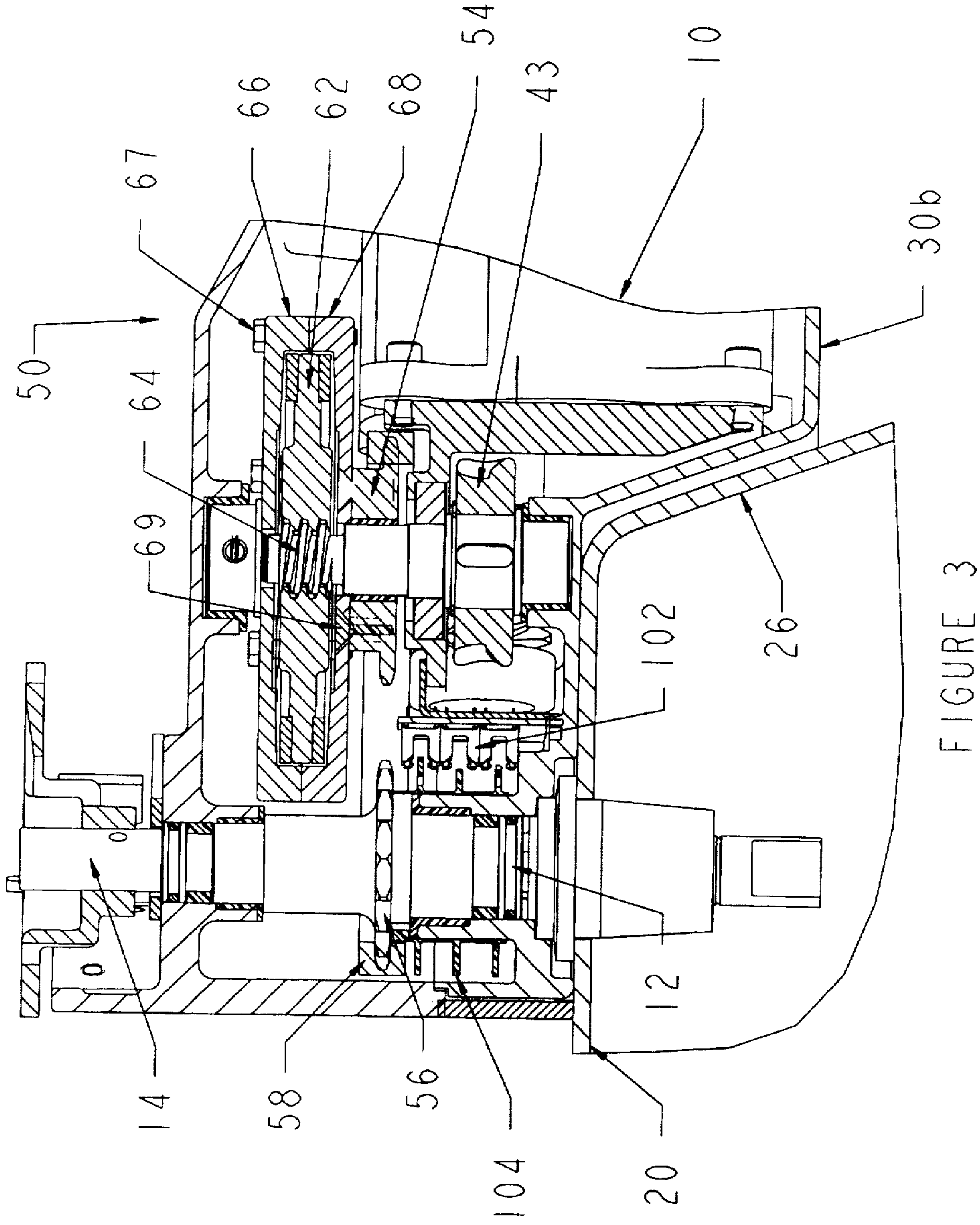
FIG. 3 is a front elevational view of FIG. 1, partly in section and with parts removed for clarity.

Referring now to FIGS. 1–3, a power operator 10 of the present invention includes an operator output 12 (FIGS. 3 and 4) and a manual drive input 14. In FIG. 1, the power operator 10 is shown in operative position on switchgear 20 with the operator output 12 affixed over a switchgear operating shaft 22 of the switchgear 20. Considering the exemplary switchgear 20 of FIG. 1, the switchgear operating shaft 22 is rotatable between predetermined open, closed and grounded positions to control operation of an operating mechanism (not shown). Similarly, via the power operator 10, the operator output 12 drives the switchgear operating shaft 22 between the open, closed and grounded positions.

The power operator 10 includes a housing 30 (FIG. 1) which includes features at 32 that cooperate with a stop ring 28 of a switchgear housing 26 of the switchgear 20, e.g. as illustrated, a bolt 32 positioned through the stop ring 28 and threaded into the housing 30 of the power operator 10. In a specific embodiment, the housing 30 includes an upper portion 30*a* (FIG. 1) and a lower portion 30*b*, the upper portion being removed for clarity in FIGS. 2 and 3.

In the illustrative arrangement, an operation selector 29 with selective blocking features is affixed around the manual drive input 14 to provide operation selection features, as explained more fully in copending application Ser. No. 08/705,442 filed in the names of B. B. McGlone et al. on Aug. 29, 1996, to which reference may be made for a more detailed discussion of these features. Briefly, the operation selector 29 prevents inadvertent operation directly between the closed and grounded positions without first stopping in an intermediate open position. In the illustrative example, the manual drive input 14 is also movable between closed, open, and grounded operational states to drive the switchgear operating shaft 22 via the operator output 12 as will be explained in more detail hereinafter.

The housing 30 of the power operator 10 supports a drive source 40 (FIG. 2), e.g. an electrical motor and drive assembly, which in a specific embodiment includes a drive output including a drive worm 42 and power connections at 110 for connection to a suitable AC or DC voltage source (not shown). The power operator 10 also includes a selective coupling mechanism 50 (FIGS. 3 and 4) that selectively couples movement of the drive output at the drive worm 42 to the operator output 12 of the power operator 10 whenever the drive source 40 operates the drive worm output 42 (FIG. 2). The selective coupling arrangement 50 is also effective to provide manual operation via the manual drive input 14 without backdriving the drive source 40.

Figure 4:
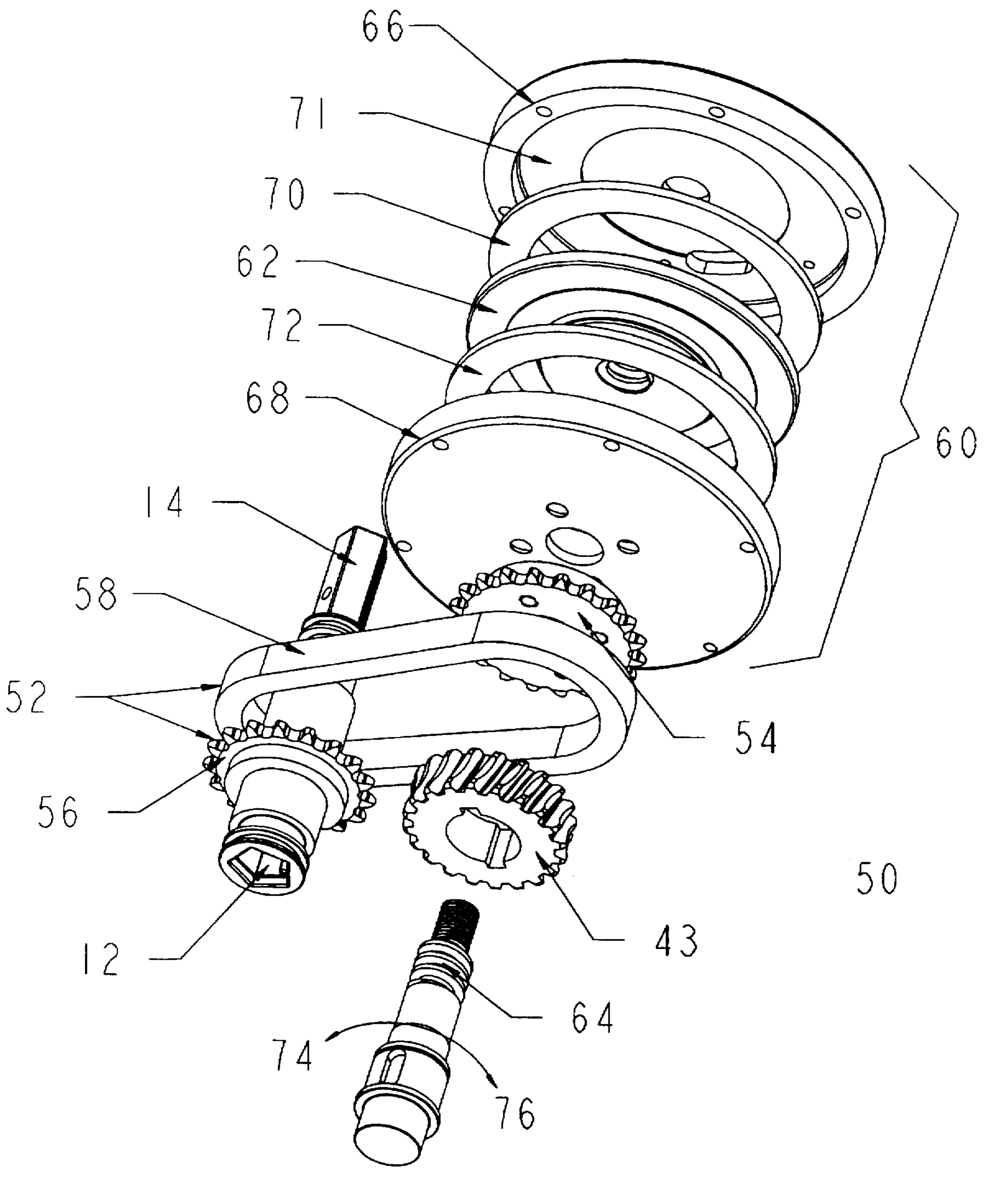
FIG. 4 is an exploded view of portions of the power operator of FIGS. 1–3 illustrating a selective coupling arrangement.

As best seen in FIGS. 3 and 4, the selective coupling arrangement 50 in a specific embodiment includes a chain and sprocket drive 52 that couples a drive output sprocket wheel 54 to an operator output sprocket wheel 56 via a chain 58. The operator sprocket wheel 56 is affixed to the operator output 12. The drive output sprocket wheel 54 is selectively driven via a drive assembly 60 that is fixedly carried by the output sprocket wheel 54. The drive assembly 60 includes a hub 62 which is driven by a drive screw 64. The drive screw 64 is rotated by a worm gear 43 that is in turn driven by the worm drive 42 (FIG. 2). The hub 62 is positioned between an upper housing 66 and a lower housing 68, the upper and lower housings 66, 68 being affixed to each other and the drive output sprocket wheel 54, e.g. in a specific embodiment via fasteners 67, 69. Each of the upper and lower housings 66, 68 include a disc-shaped drive surface 71 that faces the hub 62. In a specific embodiment, friction discs 70, 72 are affixed to the outer-facing surfaces of the hub 62.

In operation, when the drive screw 64 is rotated clockwise by the drive source 40 as illustrated by the direction arrow 74 (FIG. 4), the hub 62 is rotated and driven downward until it contacts the lower housing 68 which drives the operator output sprocket 54 which in turn drives the operator output 12 so as to be rotated clockwise, e.g. between the grounded to open or open to closed positions. When the drive screw 64 is rotated counterclockwise as illustrated by the direction arrow 76 (FIG. 4), the hub 62 is rotated and driven upward until it contact the upper housing 66 which drives the operator output sprocket 54 which in turn drives the operator output 12 so as to be rotated counterclockwise, e.g. between the closed to open or open to grounded positions. Thus, the housings 66, 68 are rotated only when the hub 62 is driven to the upper or lower limits of travel.

In accordance with important aspects of the present invention, after each switch operation between any of the predetermined positions, the hub 62 is rotated in the opposite direction to that of the operating direction so as to release the hub 62 from the respective housing 66 or 68, i.e. disengaging the hub 62 for manual operation of the power operator 10 via the manual operating shaft 14. Accordingly, manual operation via rotation of the manual operating shaft 14 does not cause any coupling of movement or force to the drive screw 64, i.e. no backdriving of the drive source 40. Additionally, it can be seen that manual operation is possible without any mode selection functions or decoupling of the drive source 40, the drive worm 42 or the worm gear 43.

Figure 5:
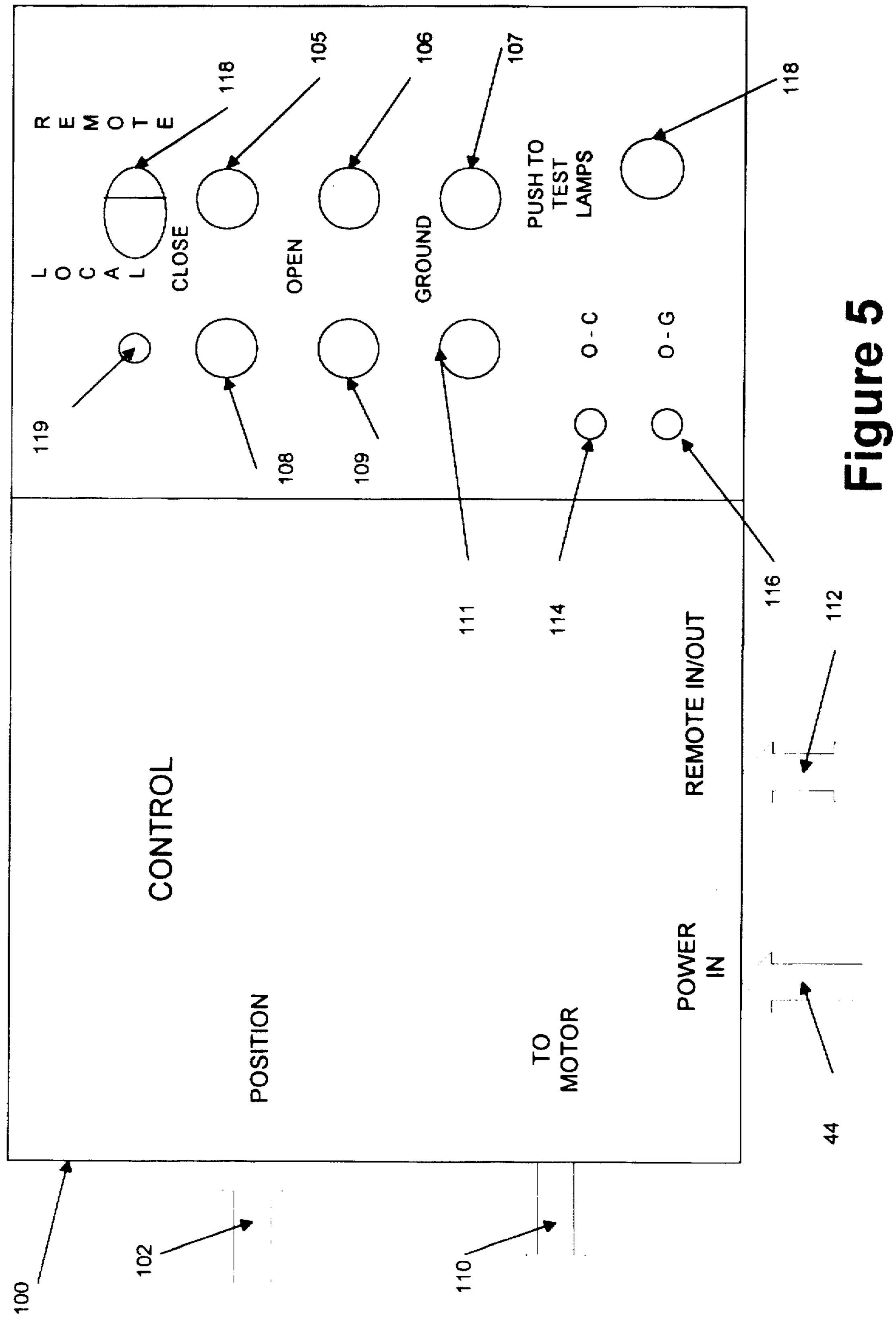
FIG. 5 is a block diagram representation of the control features of the power operator.

Considering now additional aspects of the present invention relating to the control of the power operator 10 and referring now additionally to FIG. 5, the control features of the power operator 10 are provided by a control 100 (FIGS. 2 and 5) that receives encoded position information at 102 from a position encoder arrangement 104 (FIGS. 3 and 5) located to sense the position of the operator output 12. The control 100 also senses motor current and the voltage of the power connections at 44 as will be explained in more detail hereinafter. The control 100 provides various control and monitoring functions for appropriate control of the power operator 10.

Specifically, the control 100 provides operating power to the drive source 40 over control lines at 110 to accomplish the desired switch operation functions via rotation of the operator output 12. Additionally, the control 100 provides the hub-release function at the end of each switch operation, i.e. appropriately rotating the operator output 12 so as to rotate the hub 62 in the opposite direction to that of the operating direction of the switch operation, thus releasing the hub 62 from the respective housing 66 or 68 to enable appropriate manual operation.

In a preferred embodiment, the control 100 also monitors the state of the operator output 12 additionally to the desired switch operations and the hub-release functions, i.e. disengaging the hub 62 for manual operation of the power operator 10 via the manual operating shaft 14. For example, the additional monitor functions are performed continuously while not performing other functions as will be explained in more detail hereinafter. In a specific embodiment and as will be explained in more detail hereinafter, remote inputs/outputs, generally indicated at 112, are provided to control operation of the power operator 10 remotely and also to provide signals to a remote location that represent switch position and appropriate operation transitions.

Various operating controls are provided. For example, local switch operation controls, e.g. pushbuttons 105, 106 and 107, are provided to control operation to the close, open and ground positions respectively. In a preferred embodiment, display elements 108, 109 and 111 are provided to indicate the respective switch positions. In a specific embodiment, allowable transition display elements 114 and 116 are provided to indicate that operating transitions are appropriate and/or available between open/closed and open/grounded positions, respectively. In a specific embodiment, a remote/local operation control 118 is provided to select remote or local operation along with an indicator 119.

Figure 6:
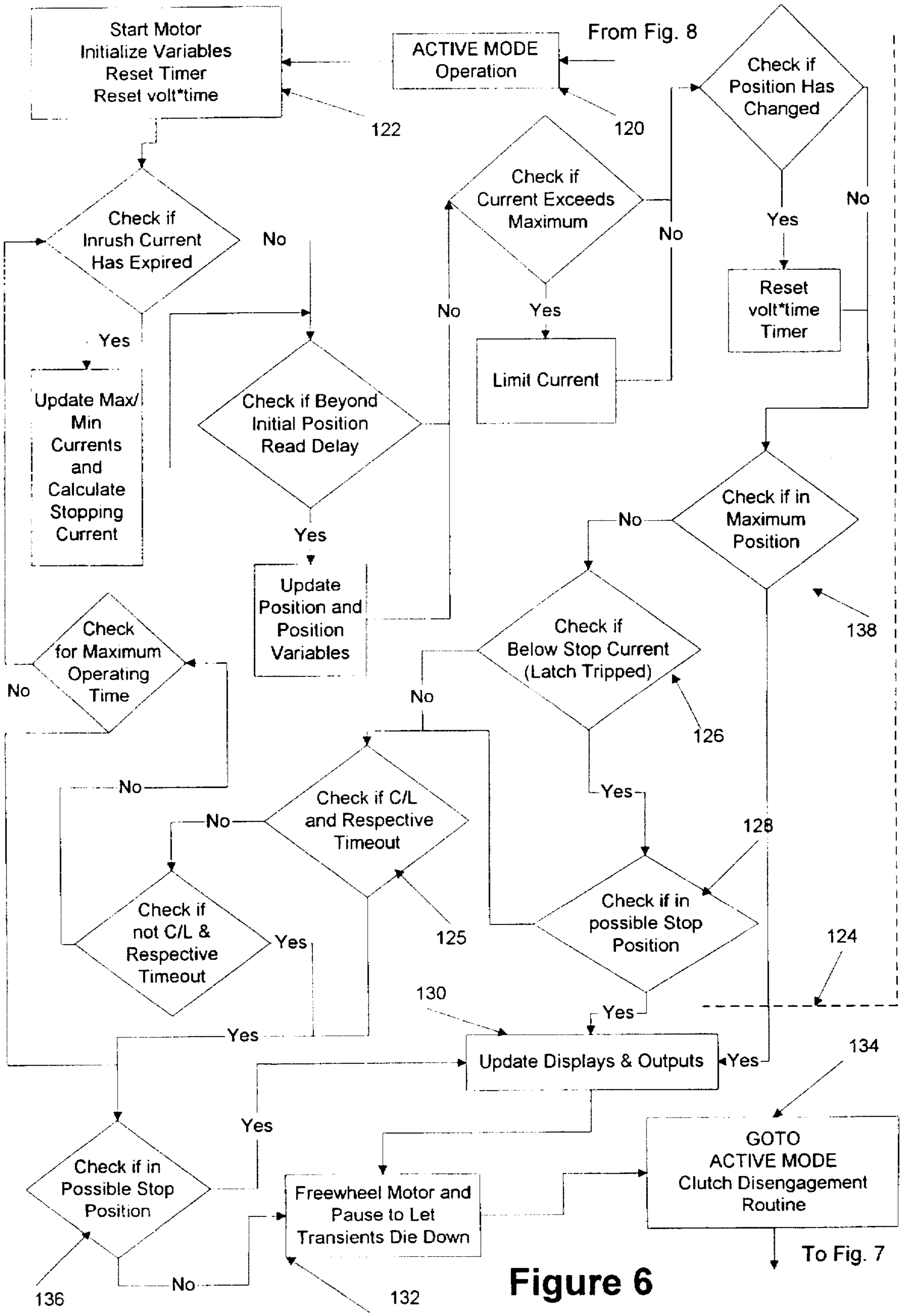
FIGS. 6–8 are flow diagrams illustrative of the control of the power operator.
Figure 7:
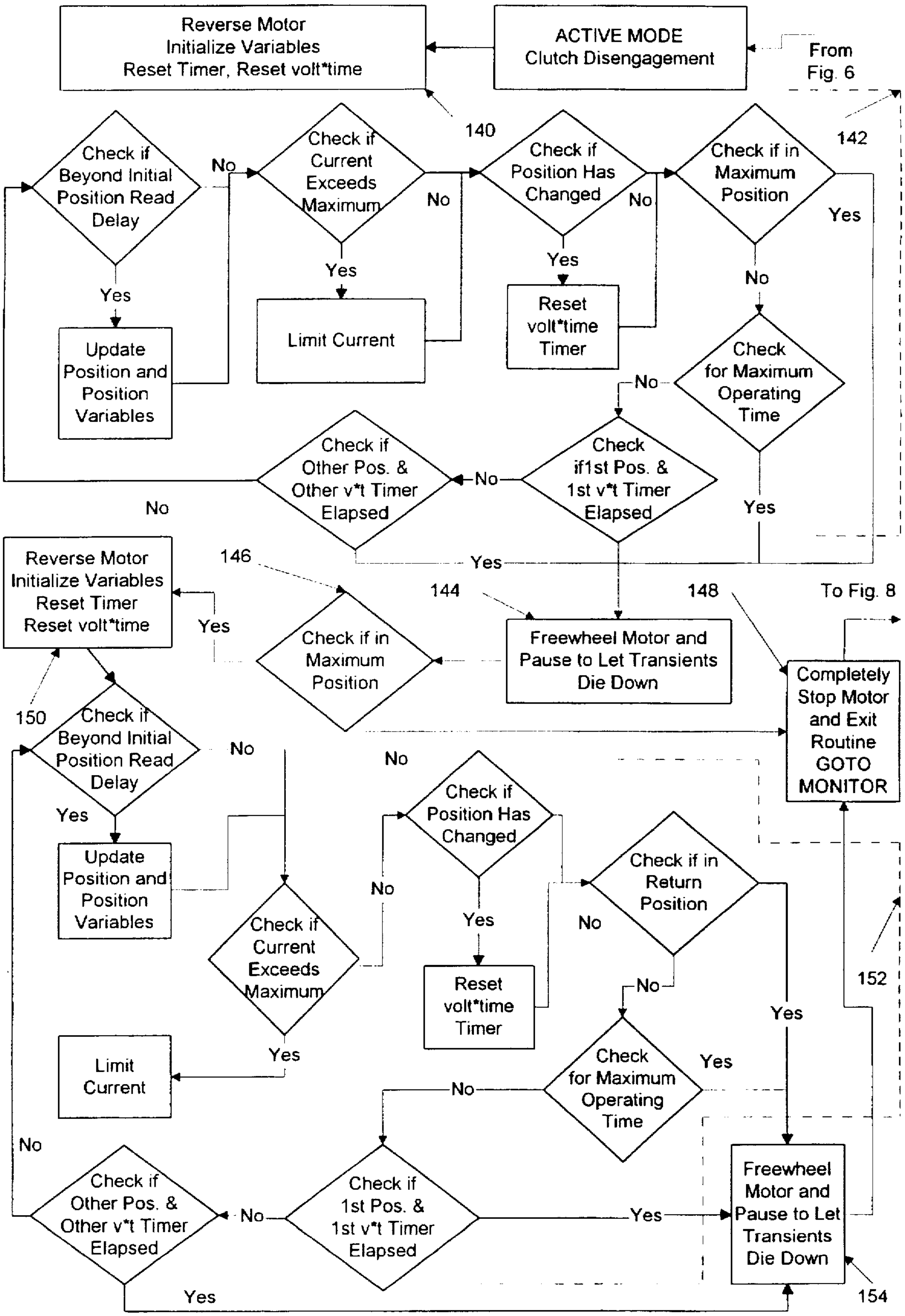
Figure 8:
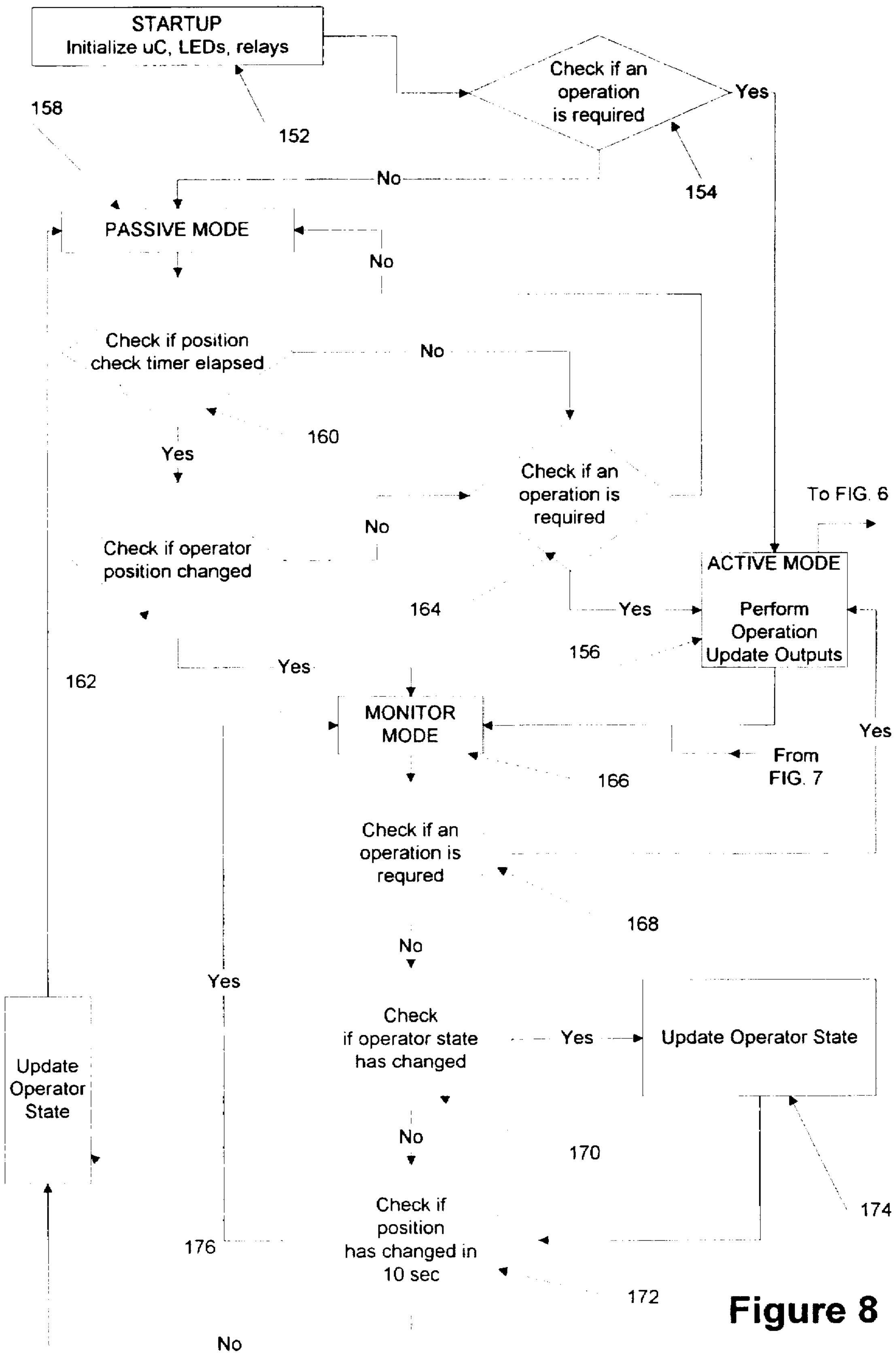

Considering now the control of the power operator 10 in more detail and with additional reference now to FIGS. 6–8, flow diagrams are shown that are suitable for the practice of the present invention to control the power operator 10 and to accomplish the various functions as outlined hereinbefore, e.g. a microprocessor executing the functions described by the flow diagrams. The flow diagram of FIG. 6 describes active operation to move the power operator output 12 between positions. The flow diagram of FIG. 7 describes the hub-release function performed at the end of each change in position operation, the hub-release function also being characterized as clutch disengagement. Further, the flow diagram of FIG. 8 describes the overall flow of operating modes including a Startup mode (initializing), a Passive mode, when the power operator 10 is not operating the output 12, and a Monitor mode which is entered when the position of the operator output 12 has changed (when in the passive mode) or after active operation has stopped. The flow diagram of FIG. 8 also describes the basic control flow and interaction between the various control modes, as will be explained in more detail hereinafter.

In accordance with important aspects of a preferred embodiment of the present invention and with specific reference now to FIG. 6, when operation between positions is desired, the control 100 determines when the operator output 12 has reached the next operating position of the switchgear 20 via the monitoring of the current drawn by the drive source 40 to detect the change in state of the operating mechanism of the switchgear 20. For example, the operating mechanism of the switchgear 20 trips a latch to drive the switchgear to the next operative position. When the latch trips, the current drawn by the drive source 40 will drop as the operating mechanism operates to drive the switchgear 20 into the operative position. Thus, while the control 100 monitors the position of the operator output 12, the decision that the operator output 12 has driven the switchgear 20 into the desired operative position is determined by the current of the drive source 40.

Specifically, when the control 100 receives an input to perform an operation as indicated by the flow from an Active Mode block 120, the program flow proceeds to a function block 122, which represents the initializing of variables and timers and the supply of current to the drive source 40, referred to as "Motor" in FIG. 6. The program flow then proceeds to a group of function and decision blocks collectively referred to at 124, wherein the position change in the operator output 12, the motor current, and time parameters are evaluated and updated. The parameter "volt*time" represents a time parameter utilized to measure a limit for position change times and evaluations, the term being more useful than time alone since the motor speed is proportional to motor voltage for the illustrative drive source 40. One decision block 125 of the group 124 is utilized to determine if the motor is in current limiting mode and a predetermined time period is exceeded. If the operator output 12 is not in a possible stopping position as determined in decision block 136, program flow proceeds to a function block 132 to terminate current to the motor.

The group 124 of blocks also includes a decision block 126 which determines if the current satisfies a detection of latch trip. For example, in one illustrative example, the stopping current is defined as the maximum current less a percentage of the difference between the maximum and minimum current, e.g. the percentage being approximately 35–40%. If such a condition is detected in the decision block 126, program flow proceeds to a decision block 128 to check if the position of the operator output 12 corresponds to a possible stop position for the desired operational position. If the decision criteria are satisfied, program flow proceeds to function block 130 to update displays and outputs, e.g. representing the operative position, and then to function block 132 to terminate current to the motor and permit freewheeling operation.

The program flow then proceeds via a program flow connecting element 134 to the clutch disengagement control flow diagram of FIG. 7. As shown in FIG. 6, program flow also proceeds to update status and stop motor operation and to the clutch disengagement function of FIG. 7 via a decision block 136 if a possible stop position is detected via other conditions such as a specified maximum operating time having elapsed in various modes including a current-limiting mode. The decision block 136, as a precaution when unforeseen circumstances are encountered, also controls the program flow to the function block 132 if the various timeouts occur and the operator output 12 is not in a possible stop position. If a maximum position is detected in a decision block 138, program flow also proceeds via function blocks 130 and 132. This condition could occur if the power operator 10 is decoupled from the switchgear 20.

Considering now the clutch disengagement process of FIG. 7, the process starts in a function block 140 wherein the current to the motor is reversed, variables are initialized, and timers are reset. Program flow then proceeds to a group of decision and function blocks collectively referred to at 142 which check if various conditions or parameters are satisfied and in response performs various updates and functions such as possible current limiting if called for. If certain position or operating time criteria are exceeded, program flow proceeds to a function block 144 where current flow to the motor is ceased. Program flow then proceeds through a decision block 146, where the determination is made as to whether or not the operator output 12 is in a maximum position. If the operator output 12 is not in a maximum position, program flow proceeds to a function block 148 wherein the motor is stopped and control proceeds to the Monitor mode control section of FIG. 8. On the other hand, if the operator output 12 is in a maximum position, program flow proceeds to a function block 150 to reverse the motor direction, via reversing the polarity of the voltage to the motor and reversing current flow. This begins a new cycle of movement of the hub 62 toward the center of its operating range. From the function block 150, program flow then proceeds to a group of decision and function blocks collectively referred to at 152, similar to the group 142. Program flow then proceeds to a function block 154, similar to function block 144, and then to the function block 148 to again proceed to the monitor program flow of FIG. 8.

Turning to a more detailed discussion of the overall program flow of FIG. 8, on startup of the power operator 10, the control 100 via a function block 152 initializes the control 100 and the various displays and outputs. The program flow then proceeds to a decision block 154 to check if any operation is being called for by the various inputs. If so, program flow proceeds to the Active mode via a function block 156 the flow diagram of FIG. 6.

If no operation is being required, the program flow proceeds from the decision block 154 to a Passive mode function block 158. From the block 158, the program flow proceeds via the decision blocks 160, 162 and 164 to check if position timers have elapsed, if operator output position has changed or if operation is required. If an operation is required, the program flow proceeds to the Active mode function block 156. If the position has changed, then the program flow proceeds to a Monitor mode function block 166. Via the Monitor mode, the program flow proceeds to further check if operation is required in a decision block 168, if the operator state has changed in the decision block 170, or if position has changed in a decision block 172.

If an operation is required, the program flow proceeds to the Active mode block 156. If the operator has changed state, the program flow proceeds to an update operator state function block 174 and then to the check position block 172. If the position has changed, the program flow proceeds to the Monitor mode block 166. If not, the program flow proceeds to an update operator state block 176. Then program flow proceeds back to the Passive mode block 158.

While there have been illustrated and described various embodiments of the present invention, it will be apparent that various changes and modifications will occur to those skilled in the art. For example is should be realized that the power operator apparatus of the present invention can be utilized to operate diverse types of equipment and can be utilized with different control arrangements, drive sources, selective coupling arrangements and methods of attachment to switchgear or the like. Accordingly, it is intended in the appended claims to cover all such changes and modifications that fall within the true spirit and scope of the present invention.

What is claimed and desired to be secured by Letters Patent of the United States is:

1. Power operator apparatus for switchgear having a switchgear operating shaft that is movable to define predetermined operating modes, the power operator comprising:

an operator output adapted to be coupled to the switchgear operating shaft;

a manual drive input coupled to said operator output;

power drive means responsive to an energy source for providing a power-driven output; and control means for selectively coupling said power-driven output to said operator output to move the switchgear operating shaft between the predetermined operating modes and for decoupling said power-driven output from said operator output for manual operation each time after moving to one of the predetermined operating modes.

2. The power operator apparatus of claim 1 wherein the switchgear operating shaft operates a stored energy mechanism which is charged and tripped to achieve the predetermined operating modes, said control means further comprising means for determining the predetermined operating modes based on the energy utilized by said power drive means.

3. The power operator apparatus of claim 1 wherein said control means further comprises means for sensing the position of said operator output.

4. A power operator for switchgear having a switchgear operating shaft that operates a stored energy mechanism which is charged and tripped to achieve different operating positions, the power operator comprising:

power drive means responsive to an energy source for providing a power-driven output;

an operator output driven by said power driven output and adapted to be coupled to the switchgear operating shaft; and control means sensing the energy consumption of said power drive means to sense the tripping of the stored energy mechanism.

5. A power operator for switchgear having a switchgear operating shaft that operates a stored energy mechanism which is charged and tripped to achieve different operating positions, the power operator comprising:

power drive means responsive to an energy source for providing a power-driven output;

an operator output driven by said power driven output and adapted to be coupled to the switchgear operating shaft;

means for sensing an operating current of said power drive means; and control means responsive to said sensing means for sensing the tripping of the stored energy mechanism.

6. Power operator apparatus for switchgear having a switchgear operating shaft comprising:

power drive means responsive to an energy source for providing a power-driven output;

a manual drive input;

an operator output adapted to be coupled to the switchgear operating shaft; and drive coupling means coupled to said power-driven output and said manual drive input for coupling movement of said power-driven output and said manual drive input to said operator output, said drive coupling means comprising means for selectively coupling said power-driven output to move said operator output after predetermined movement of said power-driven output.

7. The power operator apparatus of claim 6 wherein said power-driven output is a rotary output which is selectively rotated in either direction.

8. The power operator apparatus of claim 6 wherein said drive coupling means is uncoupled from said power-driven output when said power-driven output is in a first range of positions.

9. The power operator apparatus of claim 6 wherein said drive coupling means comprises a driven assembly which is coupled to said operator output and comprises first and second spaced apart driven surfaces which face each other, said drive coupling means further including a drive element coupled to said power-driven output and interposed between said first and second spaced apart driven surfaces, said drive element including outwardly facing drive surfaces.

10. The power operator apparatus of claim 9 wherein said power-driven output is a rotatable shaft and said drive element is coupled to said rotatable shaft.

11. The power operator apparatus of claim 10 wherein said drive surfaces and said first and second spaced apart driven surfaces are annuli.

12. The power operator apparatus of claim 6 further comprising control means for controlling said power drive means to move the switchgear operating shaft between predetermined operative conditions.

13. The power operator apparatus of claim 12 wherein said control means further comprises means for controlling said power drive means to move said drive coupling means to a condition which is uncoupled from said operator output.

14. The power operator apparatus of claim 12 wherein said control means further comprises means for sensing the position of said operator output.

15. The power operator apparatus of claim 6 further comprising control means for controlling said power drive means to move said operator output between predetermined operative conditions based on the energy being consumed by said power drive means.

16. The power operator apparatus of claim 15 wherein said control means is further responsive to the position of said operator output.

17. The power operator apparatus of claim 15 wherein said control means is further responsive to the level of the energy source and the time of operation.

18. The power operator apparatus of claim 15 wherein said control means is further responsive to the product of the level of the energy source and the elapsed time of operation.

19. Power operator apparatus for switchgear having a switchgear operating shaft comprising:

power drive means responsive to an energy source for providing a power-driven output shaft rotatable in either direction;

a manual drive input;

an operator output adapted to be coupled to the switchgear operating shaft and said manual drive input; and drive coupling means responsive to said power-driven output shaft for selectively coupling movement of said power-driven output shaft to said operator output.

20. The power operator apparatus of claim 19 wherein movement of said operator output via said manual drive input is not coupled to said power-driven output shaft when said drive coupling means is in a first range of positions.

21. Power operator apparatus for switchgear having a switchgear operating shaft comprising:

power drive means responsive to an energy source for providing a power-driven output;

an operator output driven by said power driven output and adapted to be coupled to the switchgear operating shaft; and control means for controlling said power drive means to move the switchgear operating shaft between predetermined operative conditions, for detecting whether or not the switchgear operating shaft is blocked from movement, and for detecting whether or not said operator output is coupled to the switchgear operating shaft.

22. The power operator apparatus of claim 21 wherein said control means further comprises means for controlling said power drive means to stop said operator output in a predetermined operative condition based on the operating energy of said power drive means.

23. The power operator apparatus of claim 22 wherein said control means further comprises means for sensing the position of said operator output.

24. The power operator apparatus of claim 21 wherein said control means is further responsive to the product of the level of the energy source and the elapsed time of operation of said power drive means.

25. The power operator apparatus of claim 21 wherein said power-driven output is a rotary output which is selectively rotated in either direction.

26. Power operator apparatus for switchgear having a switchgear operating shaft that is movable to operate an operating mechanism between predetermined operative modes, the power operator comprising:

an operator output adapted to be coupled to the switchgear operating shaft;

a manual drive input coupled to said operator output;

power drive means responsive to an energy source for providing a power-driven output that is selectively coupled to said operator output; and control means for moving said operator output to control the operating mechanism between the predetermined operative modes and for decoupling said power-driven output from said operator output for manual operation when not moving said operator output to control the operating mechanism between the predetermined operative modes.

27. Power operator apparatus for switchgear having a switchgear operating shaft that is movable between predetermined operative modes, the power operator comprising:

an operator output adapted to be coupled to the switchgear operating shaft;

a manual drive input coupled to said operator output;

power drive means responsive to an energy source for providing a power-driven output that is selectively coupled to said operator output; and control means for moving said operator output to achieve the predetermined operative modes via determining the predetermined operative mode and for decoupling said power-driven output from said operator output for manual operation after the desired predetermined operative mode is achieved.

28. A power operator for switchgear having a switchgear operating shaft that is movable to operate a stored energy mechanism between predetermined operative modes, the power operator comprising:

a housing;

first means for holding said housing relative to the switchgear;

a movable operator output adapted to be coupled to the switchgear operating shaft;

second means for sensing the position of said operator output; and third means responsive to said second means and an operating signal that defines a predetermined change in the predetermined operative modes for moving said operator output to an appropriate position corresponding to the predetermined operative mode on the basis of said operator output being in a predetermined range of possible stop positions and the stored energy condition of the stored energy mechanism.

* * * * *